(12) United States Patent
Emery et al.

(10) Patent No.: US 7,052,066 B2
(45) Date of Patent: May 30, 2006

(54) SLIDING, PORTABLE, VEHICLE MOUNTED COMBINATION TRUNK-WORKBENCH WITH VARIABLE HEIGHT ADJUSTMENT

(76) Inventors: Mark Emery, 4662 W. Fallen Leaf La., Glendale, AZ (US) 85310; David D. Minor, 15001 N. 6th Cir., Phoenix, AZ (US) 85023

( * ) Notice: Subject to any disclaimer, the term of this patent is extended or adjusted under 35 U.S.C. 154(b) by 65 days.

(21) Appl. No.: 10/771,799

(22) Filed: Feb. 4, 2004

(65) Prior Publication Data

US 2004/0155476 A1    Aug. 12, 2004

Related U.S. Application Data

(60) Provisional application No. 60/445,541, filed on Feb. 6, 2003.

(51) Int. Cl.
*B60R 11/06* (2006.01)

(52) U.S. Cl. ..................... 296/37.1; 296/37.6

(58) Field of Classification Search ............... 296/37.1, 296/37.6, 37.8, 37.14, 156; 224/404, 403, 224/406, 547, 557
See application file for complete search history.

(56) References Cited

U.S. PATENT DOCUMENTS

| 2,867,471 | A | * | 1/1959 | Coon, Jr. ..................... 296/156 |
|---|---|---|---|---|
| 4,085,961 | A | | 4/1978 | Brown |
| 4,283,083 | A | | 8/1981 | Johnson |
| 4,369,822 | A | | 1/1983 | Rice |
| 4,488,669 | A | | 12/1984 | Waters |
| 4,522,326 | A | * | 6/1985 | Tuohy, III .................. 296/37.6 |
| 4,531,774 | A | * | 7/1985 | Whatley ..................... 296/37.6 |
| 4,573,731 | A | * | 3/1986 | Knaack et al. ............. 296/37.6 |
| 4,635,992 | A | * | 1/1987 | Hamilton et al. .......... 296/37.6 |
| 4,705,315 | A | | 11/1987 | Cherry |
| 4,733,703 | A | | 3/1988 | Cimino |
| 4,733,898 | A | | 3/1988 | Williams |
| 4,752,095 | A | * | 6/1988 | Brady ........................ 296/37.6 |
| 4,889,377 | A | | 12/1989 | Hughes |
| 4,936,624 | A | | 6/1990 | West |
| 4,946,215 | A | * | 8/1990 | Taylor ........................ 296/37.6 |
| 4,967,944 | A | | 11/1990 | Waters |
| 5,037,153 | A | * | 8/1991 | Stark .......................... 296/37.6 |
| 5,088,636 | A | * | 2/1992 | Barajas ...................... 296/37.6 |
| 5,121,959 | A | * | 6/1992 | King .......................... 296/37.6 |
| 5,169,200 | A | * | 12/1992 | Pugh .......................... 296/37.6 |
| 5,303,969 | A | | 4/1994 | Simnacher |
| 5,398,987 | A | * | 3/1995 | Sturgis ...................... 296/37.6 |
| 5,570,988 | A | * | 11/1996 | Gallaway et al. ........... 414/498 |
| 5,664,821 | A | * | 9/1997 | Crowson .................... 294/67.1 |
| 5,664,853 | A | * | 9/1997 | Nickolaus, Jr. ........ 312/249.12 |
| 5,725,037 | A | | 3/1998 | Faulhaber |
| 5,826,906 | A | | 10/1998 | Drop, Sr. |
| 5,890,866 | A | * | 4/1999 | Scheibel ..................... 414/467 |
| 5,893,599 | A | * | 4/1999 | Strohfeldt .................. 296/37.6 |
| 5,897,154 | A | * | 4/1999 | Albertini et al. ........... 296/37.6 |
| D411,164 | S | | 6/1999 | Harris |
| 5,924,615 | A | * | 7/1999 | McGarrah .................. 296/37.6 |
| 5,924,616 | A | * | 7/1999 | Shives ........................ 224/404 |
| 5,964,492 | A | * | 10/1999 | Lyon .......................... 296/37.6 |

(Continued)

*Primary Examiner*—Kiran B. Patel

(57) ABSTRACT

An improved vehicle mounted storage unit and workbench, comprising a variably configured cabinet, upper lid with workbench surface, mechanisms for varying the cabinet's working height, slides and wheels for moving the cabinet, mounting brackets to fix the unit to a floor portion of a vehicle. The slides allow the cabinet to slide in and out of the mounting brackets, and contain a quick release feature allowing the unit to be dismounted from them and the vehicle without using tools.

20 Claims, 8 Drawing Sheets

U.S. PATENT DOCUMENTS

| | | | |
|---|---|---|---|
| 5,967,392 A * | 10/1999 | Niemi et al. | 224/404 |
| 5,979,725 A * | 11/1999 | Lehrman | 224/539 |
| 5,988,722 A * | 11/1999 | Parri | 224/403 |
| 5,992,719 A * | 11/1999 | Carter, III | 296/37.6 |
| 6,015,177 A | 1/2000 | Tijerina | |
| D426,187 S * | 6/2000 | Shultz | D12/414.1 |
| 6,116,673 A * | 9/2000 | Clonan | 296/37.6 |
| 6,203,087 B1 | 3/2001 | Lance et al. | |
| 6,253,976 B1 | 7/2001 | Coleman et al. | |
| 6,264,083 B1 * | 7/2001 | Pavlick et al. | 296/37.6 |
| 6,338,518 B1 * | 1/2002 | D'Annunzio et al. | 296/37.8 |
| 6,347,847 B1 * | 2/2002 | Tiramani et al. | 312/249.1 |
| 6,354,647 B1 * | 3/2002 | Voves | 296/37.6 |
| 6,375,054 B1 | 4/2002 | Lance et al. | |
| 6,398,283 B1 * | 6/2002 | Knudtson et al. | 296/26.09 |
| 6,422,629 B1 * | 7/2002 | Lance et al. | 296/37.6 |
| 6,460,744 B1 * | 10/2002 | Lance et al. | 224/404 |
| 6,464,274 B1 | 10/2002 | Mink et al. | |
| 6,464,277 B1 * | 10/2002 | Wilding | 296/37.6 |
| 6,607,230 B1 * | 8/2003 | Voves | 296/37.6 |
| 6,615,973 B1 | 9/2003 | Fritter | |
| 6,698,634 B1 * | 3/2004 | Thomson | 296/37.6 |
| 6,814,383 B1 * | 11/2004 | Reed et al. | 296/37.6 |
| 2002/0014505 A1 * | 2/2002 | Lance et al. | 296/37.6 |
| 2002/0017752 A1 | 2/2002 | Levi | |
| 2003/0015851 A1 | 1/2003 | Hahn | |
| 2004/0155476 A1 * | 8/2004 | Emery et al. | 296/37.6 |
| 2004/0207226 A1 * | 10/2004 | Johnson | 296/50 |

* cited by examiner

SLIDING, PORTABLE, VEHICLE MOUNTED COMBINATION TRUNK-WORKBENCH WITH VARIABLE HEIGHT ADJUSTMENT

CROSS-REFERENCE TO RELATED APPLICATION

This application claims priority to, and the benefit of, U.S. Provisional Application Ser. No. 60/445,541 filed Feb. 6, 2003, which is hereby incorporated by reference.

FIELD OF THE INVENTION

The present invention relates generally to a combination storage and workbench device, and more particularly, to a storage cabinet that can be removably affixed within the bed of a truck or similar vehicle.

BACKGROUND OF THE INVENTION

The cargo carrying area of a pickup truck, van, sport utility or similar vehicle is often referred to as the "bed". During certain types of transport it is desirable to include a storage container in a vehicle's bed to retain, for example, tools, equipment, supplies, groceries or other items to which ready and convenient access is necessary or desirable. A bed mounted toolbox represents one such storage container.

Many of the prior art bed-mounted toolboxes are inconveniently positioned. For example, the positioning of some toolboxes requires the user to lean over the sides of a truck bed to obtain a complete view of the contents. This design also makes it more difficult for items to be removed from the toolbox. Various configurations of prior-art toolboxes are described herein.

U.S. Pat. No. 4,488,669 (1984) to Waters, U.S. Pat. No. 4,531,774 (1985) to Whatley and U.S. Pat. No. 4,967,944 (1990) to Waters, each disclose varying configurations of side-mounted toolboxes. The disclosed toolboxes are permanently affixed to the vehicle bed side panels and are also difficult to access and are not automatically closed when the vehicle's tailgate is up. Side-mounted toolboxes have the additional disadvantage of extending beyond the side panels, effectively eliminating the vehicle's capability of supporting bed toppers, and frequently adding to the overall width of the vehicle.

Another configuration of a side-mounted toolbox enables the toolbox to slide along rails which are affixed to the top or insides of the vehicle's side panels; however, they too are difficult to access due to their height and the need to reach over the vehicle's tailgate or vehicle side panels. Similar side-mounted configurations are disclosed in, for example, U.S. Pat. No. 4,522,326 (1985) to Tuohy III, U.S. Pat. No. 4,635,992 (1987) to Hamilton et al, U.S. Pat. No. 4,889,377 (1989) to Hughes, U.S. Pat. No. 5,088,636 (1992) to Barajas, U.S. Pat. No. 5,121,959 (1992) to King, U.S. Pat. No. 6,464,277 (2002) to Wilding, U.S. Pat. No. 6,460,174 (2002) to Lance and U.S. Pat. No. 6,607,230 (20003) to Voves. These devices also have the disadvantage of extending beyond the vehicle's side panels, thus in most cases effectively eliminating the vehicle's capability of supporting toppers and frequently adding to the overall width of the vehicle.

In U.S. Pat. No. 6,264,083 (2001) Paulick et al, a set of wheels is mounted to the lower surface of a box which slides on rails mounted on the side panels. The addition of wheels allows the box to move when dismounted from the vehicle, but the aforementioned limitations of sliding systems still apply, and the box is limited in depth, as it must move over the intruding wheel wells.

In U.S. Pat. No. 5,588,722 (1999) to Parri, a sliding toolbox or drawer system is proposed. The primary innovation or Parri is that the mounting rails may be raised or lowered in fixed increments, whilst remaining within the confines of the vehicle bed. This system suffers from the aforementioned limitations of the other full length bed sliding systems, and requires significant effort to reconfigure the adjustable mounting rails.

Several other methods for moveable truck mounted toolboxes. For example, in U.S. Pat. No. 5,398,987 (1995) Sturgis, an external box is affixed to a side panel inside the bed and the internal enclosure rotates out towards the rear of the bed. The disadvantages of this method are limited size, the permanently mounted stationary enclosure, and the difficult access reaching over the tailgate. In U.S. Pat. No. 6,015,177 (2000) to Tijerina, a toolbox is mounted on rails attached to the inner walls of the side panels that angle up and over the wheel arches. The disadvantages of this method are difficulty in accessing the enclosure, difficulty lifting the enclosure over the wheel arches, and the non-automatic closure of the enclosure in its normal travel position. In U.S. Pat. No. 6,203,087 (2001) and U.S. Pat. No. 6,422,629 (2002) both to Lance et al, rear or front floor-mounted enclosures that are removable are proposed. The disadvantages of these proposals are the limited size of the enclosure, limited utility of the enclosure, and in the front mounted case, the difficulty of access. In U.S. Pat. No. 6,253,976 (2001) to Coleman et al, a side panel mounted sliding and rotating enclosure is proposed. The disadvantages of this proposal are the difficulty is accessing the enclosure and intrusion of the rail system on other bed uses. In U.S. Pat. No. 6,354,647 (2002) to Voves, and U.S. Pat. No. 6,464,274 (2002) to Mink et al, sliding systems mounted to the floor of the bed are proposed. The disadvantages of these systems are they prevent using the bed for any other purposes, and the enclosure is not readily portable.

In U.S. Pat. No. 5,992,719 (1999) to Carter III., an adjustable size storage enclosure that locks into the vehicle sidewalls is proposed. The primary innovation of this proposal is the ability to resize the internal enclosure by manually sliding the upper surface along brackets and then inserting retaining pins to hold it in place. The disadvantages of this system are its fixed mounting system, and the method of resizing the container.

In U.S. Pat. No. 4,946,215 (1990) to Taylor, a storage device is proposed that fits into a portion of a truck bed and locks into place with a positioning and suction cup apparatus. The storage device can be removed by unlocking it, and it is portable. The disadvantages of this proposal are that it consumes the entire rear bed space, is not readily portable when loaded, and is difficult to access when in place.

Combination toolbox and workbenches are also known. For example, in U.S. Pat. No. 4,369,822 (1983) to Rice, in U.S. Pat. No. 4,733,703 (1988) to Cimino, and U.S. Pat. No. 5,725,037 (1998) to Faulhaber, rolling workbench and toolbox combinations are proposed. The disadvantages of these proposals are they are not vehicle-mount ready, they have fixed size configurations, and limited ground clearance is provided.

Several methods have been proposed for lifting toolboxes or similar enclosures. For example, in U.S. Pat. No. 5,890, 866 (1999) to Scheibel, a self-loading transporter is proposed. The primary objective of this device is moving, loading, and lifting a container into a vehicle. The disadvantages of this proposal are that it does not provide an anchored and ready access toolbox when in the vehicle, it does not provide workbench capabilities, and it prevents other uses of the bed when loaded. In U.S. Pat. No. 6,615,973 (2003) to Fritter, a toolbox loading and unloading cart is proposed. The disadvantages of this proposal are that it has a fixed height, it does not provide toolbox or workbench capabilities, and it is not firmly affixed to the vehicle when loaded. In U.S. Pat. No. 4,936,624 (1990) to West, and U.S. Pat. No. 5,303,969 (1994) to Simnacher, permanently fixed systems are proposed for hydraulically lifting a toolbox within the confines of a vehicle. The disadvantages of these proposals are the permanence of the hydraulic systems, the difficulty of accessing the contents over the side panels, the limited functionality of the toolboxes, and the general complexity and cost of the hydraulics. In U.S. 2004/0207226 (2004) to Johnson, a truck storage and work surface tailgate is proposed. The unit is fixedly mounted attached to the tailgate, with a powered mechanism for extending and then lowering or raising the entire unit and vertically mounted tailgate to or from the ground. The disadvantages of this system are the space it consumes in the back of the truck bed, its lack of a true workbench surface, and its lack of accessibility while mounted.

In U.S. Pat. No. 5,9644,492 (1999) to Lyon, a stowage receptacle is proposed for the rear area of a pickup truck bed. This unit mounts on slide rails in the bed, and slides out over the tailgate. The disadvantages of this system are its lack of workbench capabilities, its limited mobility when dismounted, the inability to raise or lower it, and limitation in weight carrying capacity because all of its weight must be supported by the slide rails.

All of the vehicle mounted toolbox systems are heretofore known suffer from some combination of the following disadvantages which include not being readily portable after being removed from the vehicle at a destination or jobsite, not readily reconfigurable to the proper height for workbench uses, do not provide workbench capabilities, do not allow for the use of the side panel rails for other normal purposes, do not allow for the use of the main bed for other normal purposes, inconvenient access to the contents of the toolboxes by virtue of mounting position, height, or reach and locking mechanism and subsequently the contents of the toolbox are not protected from tampering when the tailgate is closed.

SUMMARY OF THE INVENTION

To overcome the limitations in the prior art described above, and to overcome other limitations that will become apparent upon reading and understanding the present specification, hereinafter referred to as a "trunk-bench", the present invention is an improved device for storing objects and providing a workbench. While the way in which such a device can be configured and may be used to address the foregoing disadvantages will be described in greater detail hereinbelow, in general, when engaged within a vehicle bed, the trunk-bench can be moved and removed.

In accordance with an exemplary embodiment of the present invention, the trunk-bench is suitably sized in order that it may be mounted to a rear floor portion of a vehicle having juxtaposed vehicle side panels spaced apart by a predetermined first distance, juxtaposed wheel wells each having a portion that extends outwardly from its respective side panel, and a rear vehicle tailgate that is pivotally moveable between a closed position and an open position. The tailgate being spaced from the rear portion of the wheel wells by a predetermined second distance and having a predetermined length of a third distance and a predetermined height approximately equivalent to that of the side panels of a fourth distance.

The storage unit comprises a cabinet having a length not greater than the third distance, a depth not greater than the second distance, with no portion of the cabinet extending outside of a space bounded by a vertical plane coinciding with the rear portion of the wheel well, and a second vertical plane coinciding with the interior portion of the tailgate when the tailgate is in its closed position, and a height, in its normal position, not greater than a plane defining the top surfaces of the side panels.

The cabinet comprises a pivotally moveable hinged upper surface firmly attached to the rear vertical member of the cabinet that extends laterally beyond the vertical side members of the cabinet with a total length no greater than the third distance, a width no greater than the second distance, and has pneumatic or similar struts to support it in a variety of open positions.

The cabinet also comprises a center storage section with a plurality of removable central dividers, pivotally movable doors revealing the interior of the cabinet, and a plurality of drawers disposed in the bottom portion of the cabinet in a side-by-side fashion. Each of the drawers has a predetermined depth that will fit inside the interior of the cabinet and that is less than the second distance, and a width that is not greater than one half the length of the lower section of the cabinet. The cabinet also comprises a plurality of drawer support members that support the drawers so that the drawers can slide back and forth in a direction parallel to the length of the cabinet.

Moreover, the cabinet comprises a plurality of variably adjustable height mechanisms and wheel assemblies each comprising at least one cylinder, height adjustment actuator, wheel platform, and guide rods. The cylinders are enclosed and firmly attached at one end to the interior of the cabinet and at the other end to the wheel platform. The cylinders are positioned towards the ends of the cabinet, and move in a vertical direction, perpendicular to the length of the cabinet. The cylinders may have a variable pressure adjustment system to vary the amount of force they can apply when raising or lowering the storage unit. The cylinder actuators are integrated into the cabinet and activate the height adjustment mechanism by depressing a pressure release button mounted in the upper end of each cylinder.

The wheel platforms each comprise a horizontal platform that is sized to fit in cutouts in the bottom portion of the cabinet and each has a plurality of fully articulating caster wheels firmly attached to the lower surface of the platform. Each of the wheels may have a locking mechanism to prevent or allow rolling.

There is a plurality of guide rods for each wheel platform, firmly attached to the upper surface of the wheel platform, and mounted parallel to the cylinders. Each guide rod slides vertically in and out of a corresponding guide hole in the body of the housing for the cylinder wheel assemblies.

The storage unit also has a plurality of retention members, at least one on each side, firmly affixed to the vehicle. The retention members comprise brackets securely attached to the floor of the bed or side panels of the vehicle in the defined space and not to exceed the first, second, or fourth dimensions. The retention members also comprise cabinet support slides that partially support and guide the cabinet and allow the cabinet to move in a direction parallel to the length of the bed between a stored position where no portion extends beyond a vertical plane defined by the interior surface of the tailgate in its closed position, and an extended position when the cabinet is positioned over the extent of the tailgate in its open position. The retention members also comprise a retention belt system. The rolling belt retractor is mounted on one of the retention members and the buckle fastener mounted on the paired retention member. The rolling belt threads through a firmly attached ring mounted on any one or more vertical surfaces of the cabinet.

In various embodiments, the invention includes a vehicle mounted trunk-bench that allows for convenient and easy access while mounted in the bed of a vehicle, slides out over the tailgate of said vehicle, is easily detached from said vehicle, functions as a workbench, is easily transportable, functions as a rolling standalone trunk-bench when detached from the vehicle, with a height that can be easily and variably adjusted, is capable of effectively containing significant weight while providing the other noted features, is protected from tampering when the tailgate is closed, includes a safety system to prevent sudden movement of said trunk-bench, easily locks securely into place in said vehicle bed and can be internally reconfigured for multiple functions.

The features and advantages of the present invention will be apparent to those of ordinary skill in the art in view of the detailed description of the preferred embodiments, which are made with reference to the drawings, a brief description of which is provided below.

BRIEF DESCRIPTION OF THE DRAWINGS

The above objects and advantages of the present invention will become more apparent by describing in detail preferred embodiments thereof with reference to the attached drawings in which.

DETAILED DESCRIPTION

Figure 1:
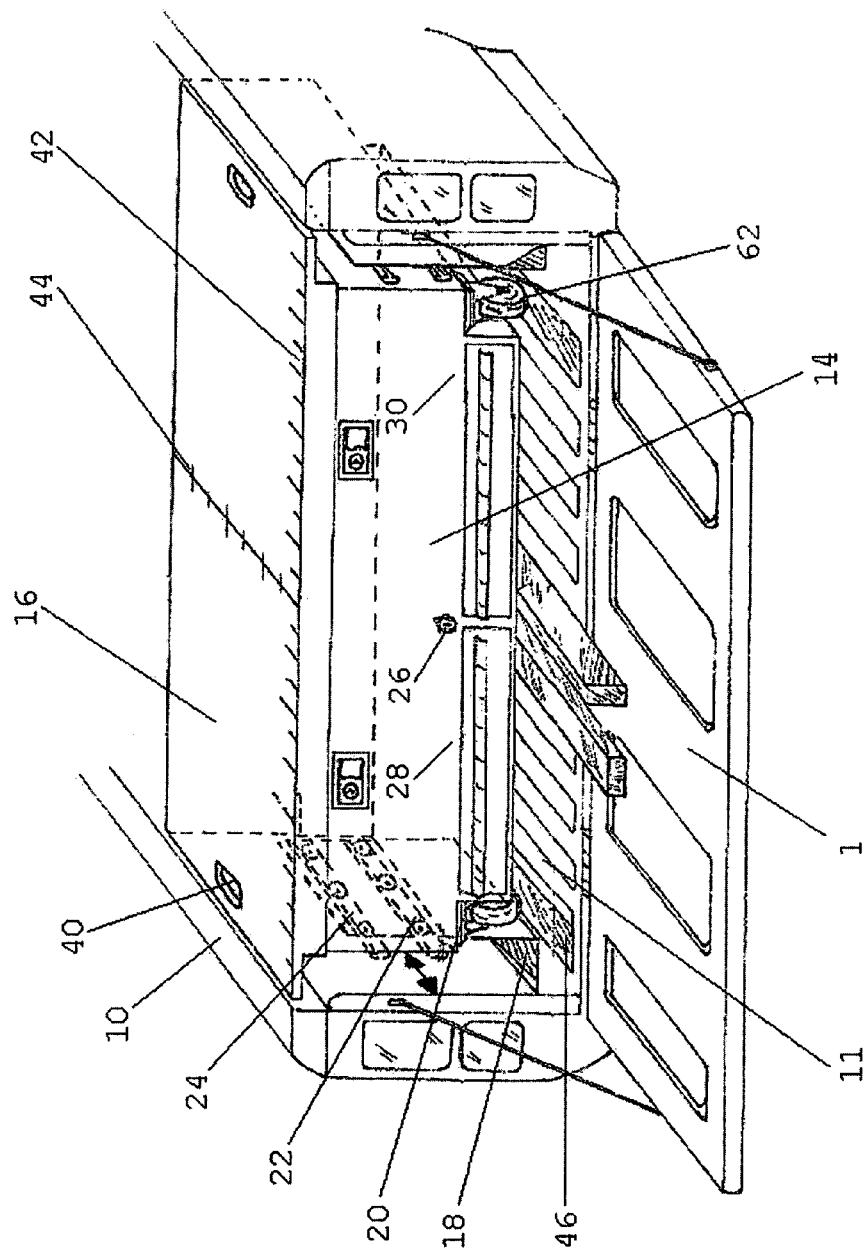
FIG. 1 is a partial cutaway view from above and in front of the trunk-bench as it would be mounted in the bed of a pickup truck in accordance with an exemplary embodiment of the present invention.

In the following description of the exemplary embodiment, reference is made to the accompanying drawings, which form a part hereof, and in which is shown by way of illustration the specific embodiment in which the invention may be practiced. It is to be understood that other embodiments may be utilized as structural and/or design changes may be made without departing from the scope of the present invention.

A trunk-bench, as used herein, may include any storage unit suitably configured to be placed in the bed of a vehicle. A trunk-bench may comprise, for example, storage bins, cabinets, drawers and the like. Practitioners however, will appreciate that the present invention may also be employed in any number of other applications for which a need exists for storage space.

With reference to the appended drawings, FIGS. 1–8, it should be noted that these drawings are exemplary in nature wherein like reference numerals designate like parts as referred to in the following preferred embodiments, and which in no way serve to limit the scope of the invention.

FIG. 1 is a partial cutaway view from above and in front of an exemplary trunk-bench as it would be mounted in the bed of a pickup truck. The body of the cabinet 14 is constructed of a sturdy material such as a durable plastic, aluminum, light gauge steel and the like. Cabinet 14 is dimensioned to be received within the vehicle side panels 10, and is attached to mounting brackets 18 on each side using a plurality of heavy duty slides 22 lower, and 24 upper, on each side. Mounting brackets 18 are securely attached to the base of pickup bed 11 that has both vertical side panels 10 and a pivotally hinged tailgate 12. The drawer slides support cabinet 14 and allow it to slide out over the tailgate 12 while in a lowered position.

The lid 16 of cabinet 14 has a top surface that is smooth and flat with etched or marked vertical 44 and horizontal 42 scales. The scales may be used for aligning and measuring various items or materials. Lid 16 also has a plurality of handholds 40, shown as one on each side, that are used to facilitate moving cabinet 14 while in use. In a preferred embodiment, the upper surface of lid 16 would ideally be constructed of a non-abrasive, dent resistant metal such as, for example, stainless steel. The lid 14 will be discussed in greater detail in reference to FIG. 2.

Figure 4:
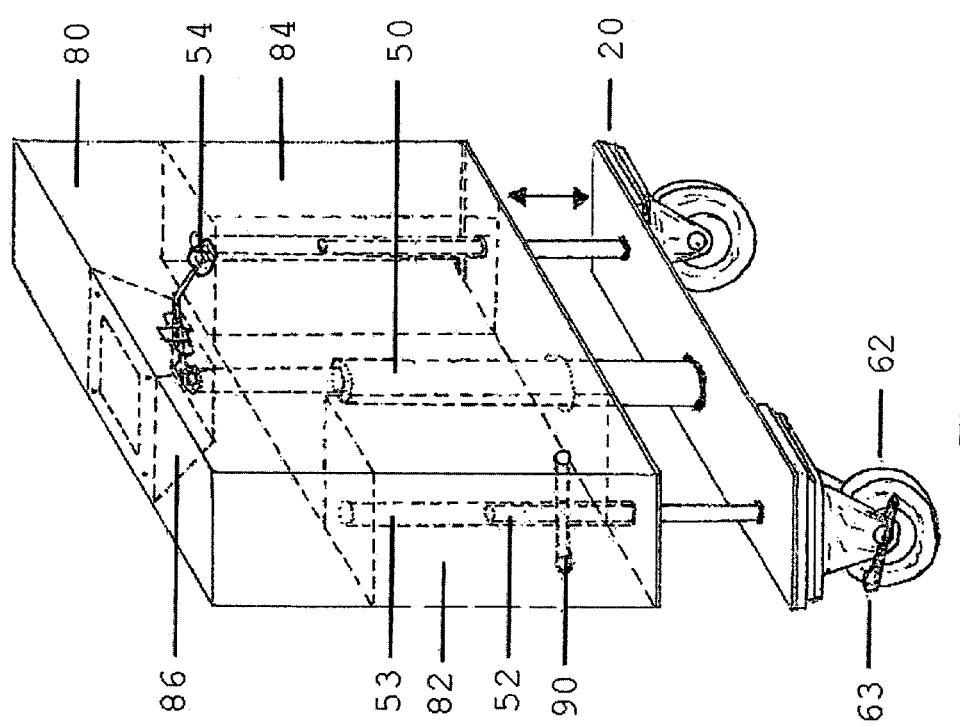
FIG. 4 is a perspective of an internal cylinder mechanism that is used to raise and lower the trunk-bench in accordance with an exemplary embodiment of the present invention.

FIG. 4 is a perspective of an internal cylinder mechanism that is used to raise and lower the trunk-bench in accordance with an exemplary embodiment of the present invention. The wheel platforms 20 are permanently and securely attached to the cylinder and guide rods mounted inside the trunk-bench. The wheel platforms 20 are raised and lowered by adjusting the position of the actuator arms 54. They are also attached to a plurality of lockable wheels 62 securely mounted on the outside lower surface of each wheel platform 20.

With reference to FIG. 1, wheels 62 extend below the lowest surface of the trunk-bench when cabinet 14 is fully lowered to allow access to a space having a predetermined vertical height for a variety of items. To assist with aligning cabinet 14 on the slider/rails 22, 24 as it is being installed, the wheels 62 rest on the surface of the alignment ramps 46. Alignment ramps 46 may be free standing as shown or pivotally attached by a flat hinge to the base of mounting brackets 18 and fit into or over the pickup bed 11 grooves and extend outward over the tailgate 12. In an embodiment, the alignment ramps are constructed of a durable and slightly rough substance to provide rolling friction.

Figure 3:
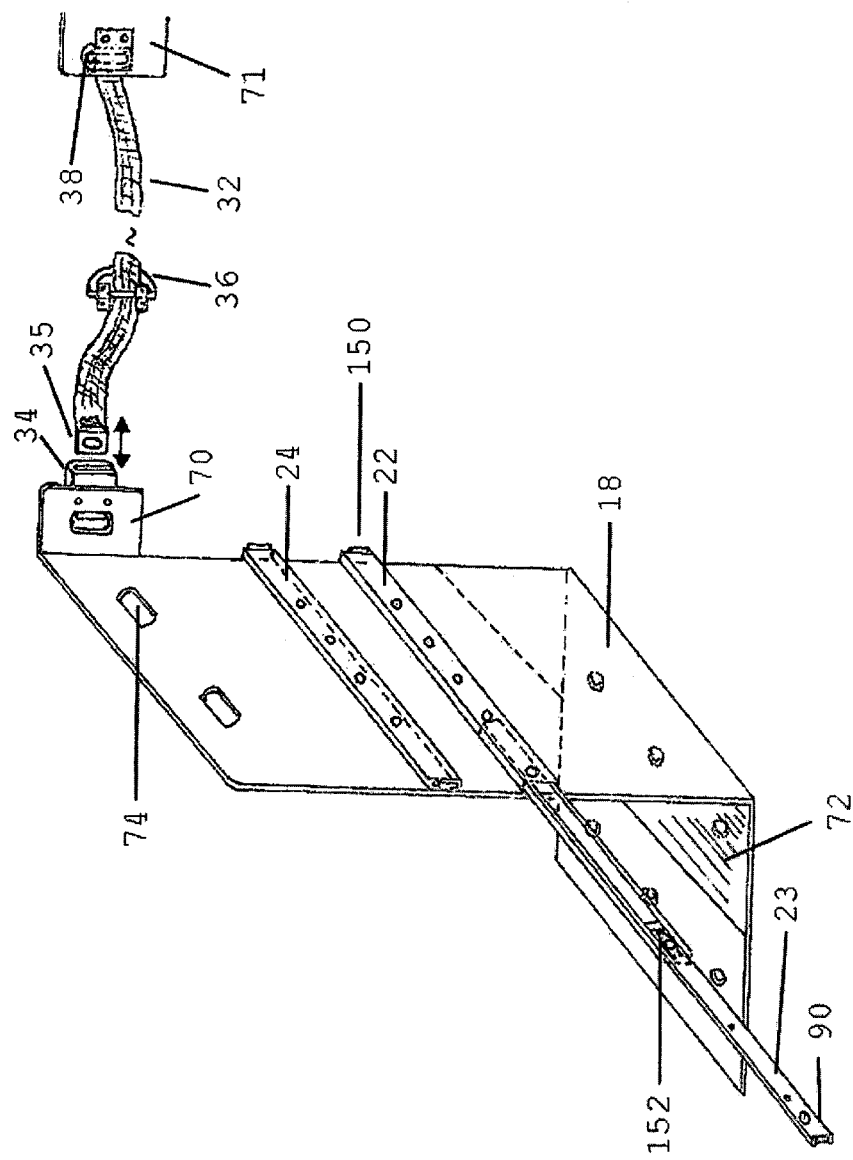
FIG. 3 is a perspective view of the mounting brackets and support slides used to mount an trunk-bench in a vehicle bed in accordance with an exemplary embodiment of the present invention.

FIG. 3 is a perspective view of the mounting brackets and support slides used to mount a trunk-bench in a vehicle bed in accordance with an exemplary embodiment of the present invention. At the rear of cabinet 14 is a retaining belt 32, similar to a seatbelt, that runs through a retaining D-ring 36 that is securely attached to one or more vertical surfaces of the cabinet 14. One end of the belt is attached to a belt retractor 38 that is securely mounted on the right side mounting bracket 18. The other end of the belt has a durable buckle 35 that plugs into the quick release connector 34. The quick release connector 34 is securely mounted on the left side mounting bracket 18.

Figure 6:
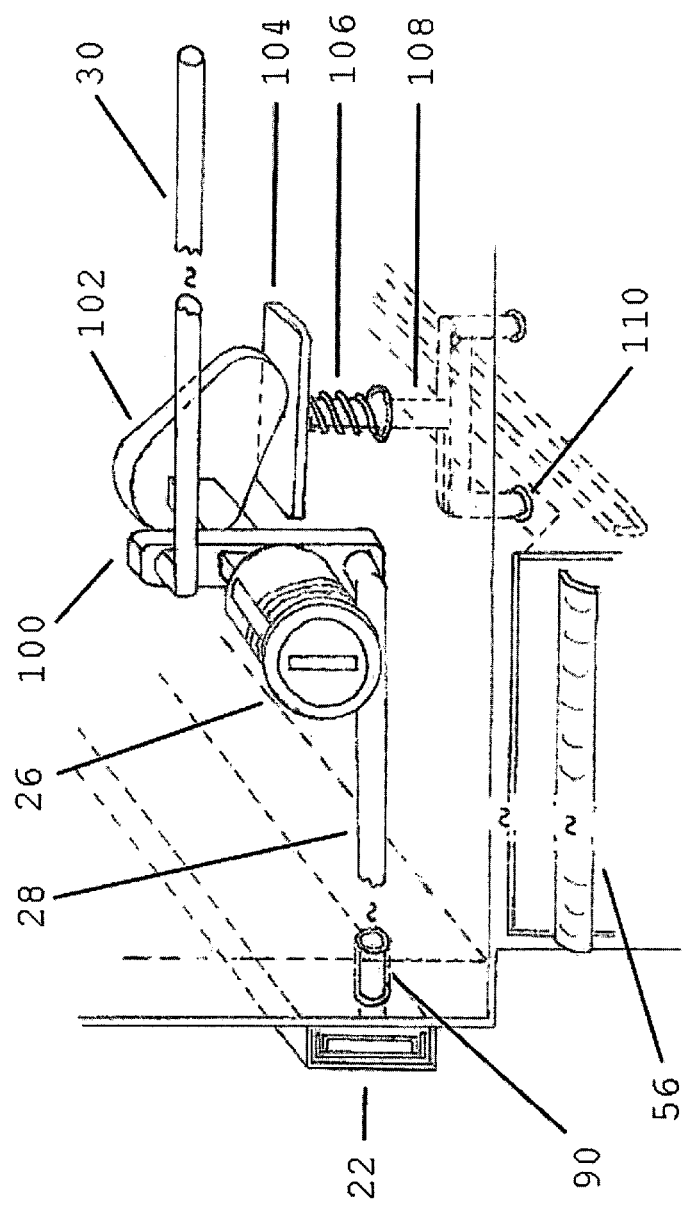
FIG. 6 is a perspective detail drawing of the lower locking mechanism that is used to secure the box to the support slides and prevent the lower drawers from being opened in accordance with an exemplary embodiment of the present invention.

FIG. 6 is a perspective detail drawing of the lower locking mechanism that is used to secure the box to the support slides and prevent the lower drawers from being opened in accordance with an exemplary embodiment of the present invention. The entire cabinet 14 can be locked into the slide rails 22 positioned on each side with internally mounted locking rods 28, 30 and lock cylinder/shaft 26. The locking rods 28, 30 are actuated by the lock cylinder/shaft 26 in the front of the cabinet 14. Additionally, the lower drawers 56 can be locked at the same time by the U-rod 108 ends engaging the locking holes 110. When it is in the locked position, this entire locking mechanism prevents the cabinet 14 from sliding on the slide rails 22 and prevents the drawers 56 opening unintentionally.

Figure 2:
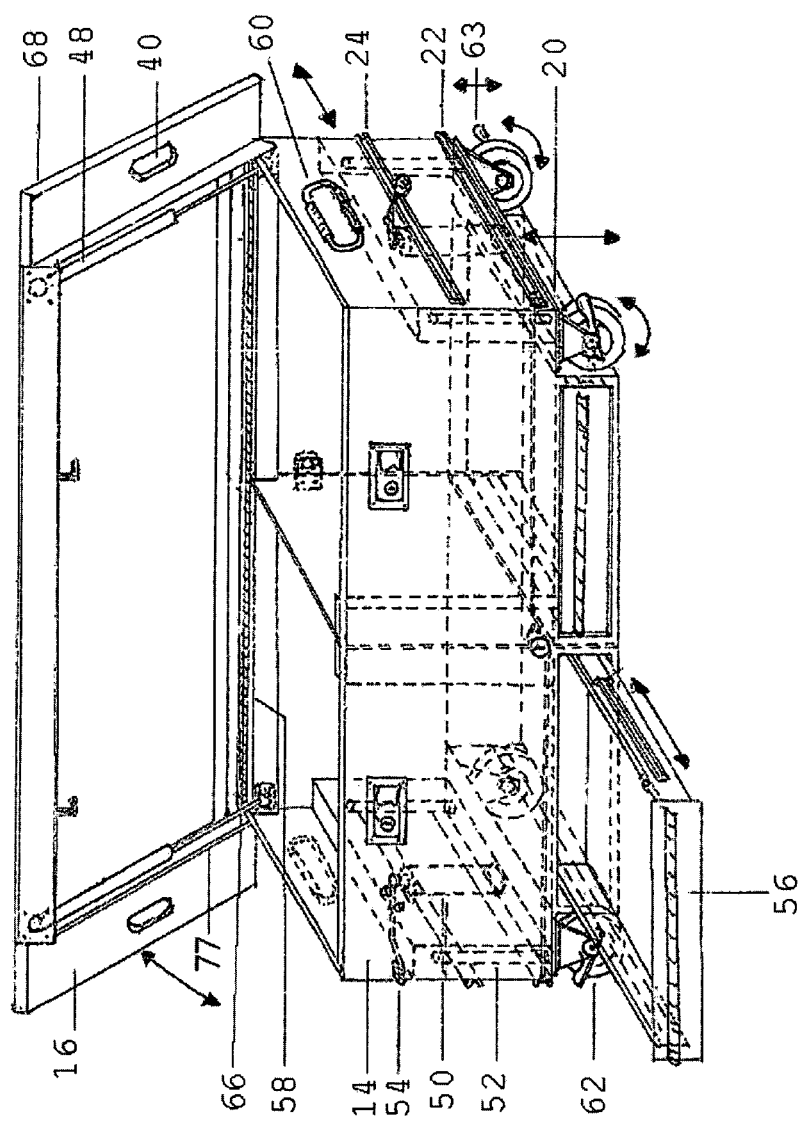
FIG. 2 is a perspective view of the standalone trunk-bench illustrating the configuration and basic inner workings of the truck-bench in accordance with an exemplary embodiment of the present invention.

FIG. 2 is a perspective view of the standalone trunk-bench illustrating the configuration and basic inner workings of the truck-bench in accordance with an exemplary embodiment of the present invention. The lid 16 has a hinge 66 that runs the entire length of the cabinet 14 and one or two small struts 48 that keep lid 16 in a variable or fully raised position. Furthermore, lid 16 contains a small compressible gasket 77 of rubber or a similar substance, running along its perimeter that mates with the body of the cabinet 14. Note also that both ends 68 of lid 16 protrude over the edge of cabinet 14 by a distance sufficient to cover the slide mechanisms and to be used for workbench purposes (for clamping, sawing, drilling, etc.). Lid 16 is latched with a plurality of lockable release handles 64. Release handles 64 keep lid 16 secure and along with gasket 77 sealed against the elements. Lastly, a center removable panel 58 is shown in place. There may be a plurality of panels 58 that can be removed to make a single long central storage area or moved to vary the size of several smaller storage area.

FIG. 2 also shows the motion of the various elements of the trunk-bench. Wheels 62 roll and pivot, and wheel locks 63 pivot to/from locked/unlocked positions. The wheel platforms 20 on both sides slide up and down, driven by the motion of cylinders 50. Cylinders 50 move up and down respectively by raising or lowering the actuator handles 54. Drawers 56 slide in and out and lid 16 pivots open and closed along its hinge point 66. With reference to FIG. 1, cabinet 14 slides in and out over the tailgate 12 on the slides/rails 22, 24 attached to the mounting brackets 18, and on the wheels 62 which rest on the alignment ramps 46.

Referring again to FIG. 3, details of the left mounting bracket 18 are shown. The right mounting bracket is a mirror image of the left mounting bracket 18, with the exception of the retractable retention belt hardware 34, 38. The mounting brackets are securely mounted to the floor of the pickup bed using heavy duty bolts or may be welded in place. The body of the mounting bracket 18 is made of hard and durable material such as steel and has a plurality of supporting angle brackets 72 for rigidity. At the rear of mounting bracket 18 is a retaining ear 70 that prevents cabinet 14 from moving forward inadvertently or in case of an accident. Retaining ear 70 provides a mounting point for the quick release belt mechanism 34 and the other retaining ear 71 on the opposing mounting bracket 18 provides a mounting point for the belt retractor 38. Mounting bracket 18 has a number of tie-down holes 74 for general use with ropes or other fastening devices.

FIG. 3 also shows one embodiment of the slides. In this instance, upper slide 24 is in its fully retracted position and lower slide 22 is in its fully extended position. Drawer member 23 is the portion of slide 22 that is securely and permanently connected to the side of cabinet 14. A slide stop 152 prevents overextension of the slide 22. With reference to FIG. 6, when cabinet 14 is in its fully retracted position a lock hole 90 in slide 22 aligns with locking rod 28. In the locked position, locking rod 28 is fitted through lock hole 90 and into slide mechanism 22. According to this embodiment, the lower mounting surface 72 of the mounting bracket extends outward toward the bed side surface. In an alternative and preferred embodiment, the lower mounting surface 72 extends inward toward the lateral center of the bed, and provides an extension of alignment ramps (FIG. 1, 46). In the alternative implementation, alignment ramps (FIG. 1, 46) are attached to the lower surface 72 of each respective mounting bracket 18 by hinges that allow the alignment ramps (FIG. 1, 46) to pivotally move from a horizontal position to a vertical position.

Referring again to FIG. 4, the right wheel platform and cylinder assembly 80 is shown mounted in the right side of the cabinet 14. The left side wheel platform and cylinder assembly 80 is a mirror image of the right side. As illustrated in FIG. 4, the wheel platform 20 is extended approximately midway between the retracted and extended positions. To prevent wheel platform 20 from twisting, guide rods 52 move up and down in the rod guides 53. Rod guides 53 are vertical holes drilled or formed in the guide mounting blocks 82, 84. Both guide rods 52 and the lower portion of cylinder 50 move vertically in appropriately sized holes through the housing of assembly 80. Similarly, the locking rod (FIG. 6, 30) moves back and forth laterally through the locking rod hole 90 drilled horizontally through the front guide mounting block 82 and the lower support slide (FIG. 6, 22).

Figure 5:
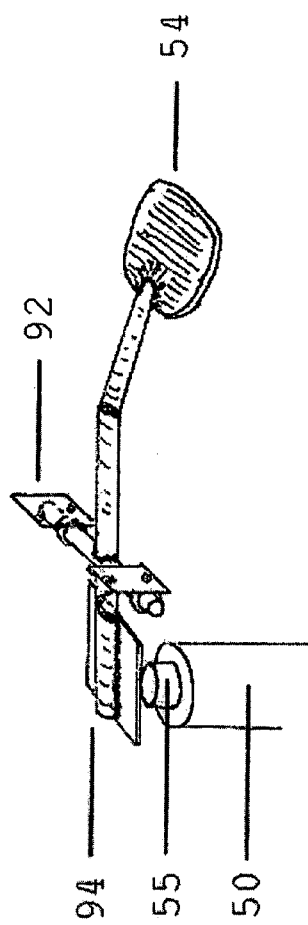
FIG. 5 is a perspective detail drawing of the cylinder activating handle mechanism in accordance with an exemplary embodiment of the present invention.

FIG. 5 is a perspective detail drawing of the cylinder activating handle mechanism in accordance with an exemplary embodiment of the present invention. The cylinder 50 is permanently and securely affixed to wheel platform (FIG. 4, 20) and to the upper support bracket (FIG. 4, 86). The actuator arm 54 is raised to depress the cylinder release button 55 and thereby extend, under no load, cylinder 50 or retract it, under a heavy load. Actuator arm 54 mechanism pivots around the orthogonal arm 94, depresses the cylinder release button 55, and is securely mounted to the inside of the assembly (FIG. 4, 80) using the mounting attachment 92.

Referring again to FIG. 6, the lower locking mechanism is illustrated which secures cabinet 14 by moving the locking rods 28,30 horizontally through the holes 90 in the guide mounting blocks and subsequently through holes 90 in the lower slides 22. The locking mechanism simultaneously pushes the U-rod 108 and the U-rod ends through the locking holes 110 in the drawer assemblies 56. This action is accomplished by turning the mechanism of the lock cylinder/shaft 26 clockwise, which moves the lock actuator arm 100, and the lock cam 102. When pressure is released by turning the lock cylinder/shaft 26 counterclockwise, the cam 102 is forced up by the cam spring 106 exerting pressure on the U-rod plate 104 and thereby keeping the U-rod and locking rods retracted.

Figures 7A, 7B:
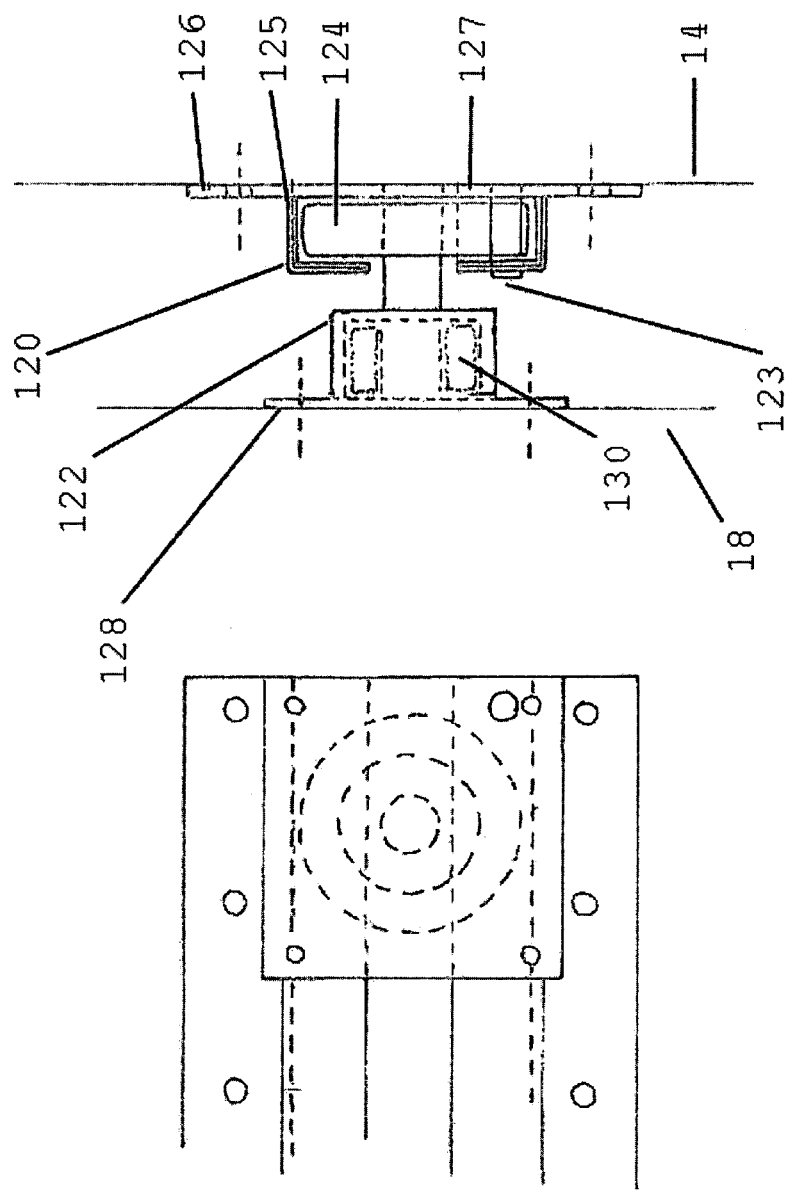
FIG. 7A is an elevation drawing illustrating method for implementing the support slides in accordance with an alternative embodiment of the present invention.
FIG. 7B is an orthogonal view of the alternative embodiment illustrated in FIG. 7A; and, FIG. 8 is an elevation drawing of the front of the trunk-bench showing hinged front opening panels in accordance with an alternative embodiment of the present invention.

FIG. 7A is an elevation drawing illustrating a method for implementing the support slides in accordance with an alternative embodiment. Two parallel C-channels 120 are securely mounted on the body of cabinet 14 using mounting ears 126. A set of T-roller wheels 124 rolls in the C-channels 120 and is supported by their shaft and bearing set 130. The bearing housing 122 is securely affixed to the mounting brackets 18. Each of the C-channels 120 has a quick release 123, end-stop 127 and inner/outer channels 125 similar to the slides (FIG. 2, 22, 24).

FIG. 7B is an orthogonal view of the alternative embodiment illustrated in FIG. 7A.

Figure 8:
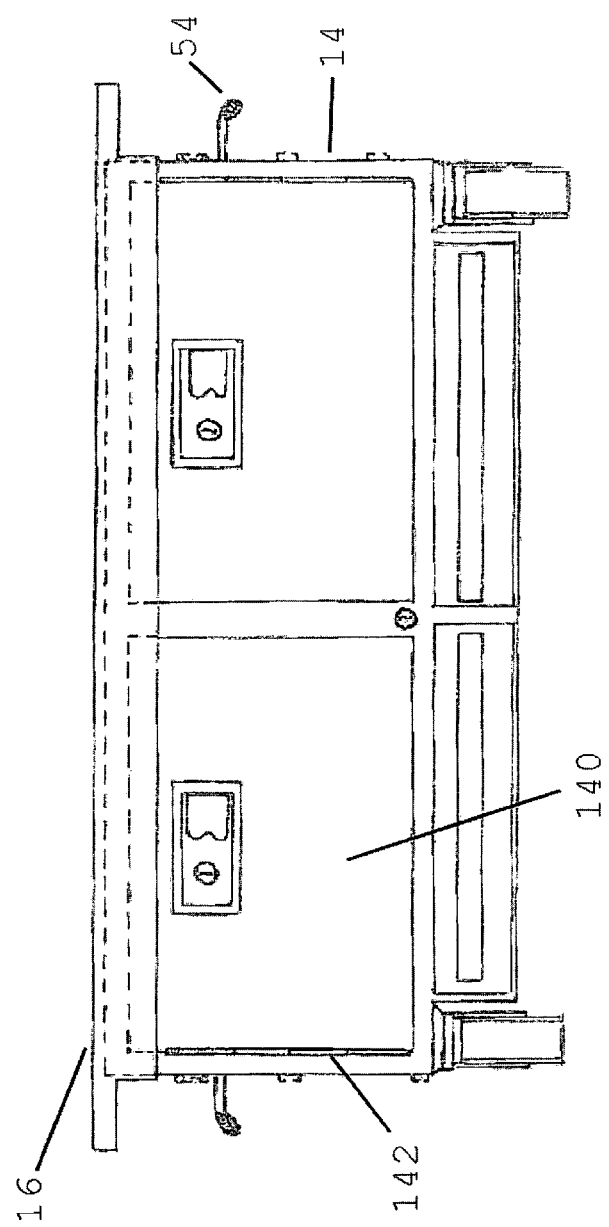

FIG. 8 is an elevation drawing of the front of the trunk-bench showing hinged front opening panels in accordance with an alternative embodiment of the present invention. The panels 140 have respective hinges 142 along the length of their outside edges. For security purposes, panels 140 may only be opened after lid 16 has been raised. Each panel 140 has friction locks on the lower center edges for positive locking and to assist in weather sealing.

The foregoing descriptions of the exemplary embodiments of the invention have been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

The invention claimed is:

1. A cabinet system configured to be received within a vehicle bed, said cabinet system comprising:
   a cabinet having a storage area, a first side and a second side;
   a first bracket configured to movably mount to said first side of said cabinet;
   a second bracket configured to movably mount to said second side of said cabinet;
   an adjustable height device integral with said cabinet, wherein said adjustable height device at least one of raises and lowers said cabinet;
   said adjustable height device comprising a first member reciprocally received within a second member, at least one of said first member and said second member being sealed so as to maintain at least one of a pressurized gas and a pressurized liquid;
   a height adjustment actuator interfacing with said adjustable height device and configured to control said first member;
   a guide rod assembly comprising a first guide member reciprocally received by a second guide member, wherein said second guide member is affixed to said adjustable height device and said first guide member is affixed to a wheel platform;
   said wheel platform comprising a top horizontal surface wherein said second member is affixed to said top horizontal surface; and,
   an articulating wheel affixed to a lower surface of said wheel platform.

2. The system of claim 1, wherein said first bracket is configured to mount near a first side of said vehicle bed and said second bracket is configured to mount near a second side of said vehicle bed.

3. The system of claim 1, wherein said cabinet is constructed from at least one of plastic, aluminum and light gauge steel.

4. The system of claim 1, wherein said cabinet comprises an upper surface having pneumatic struts configured to support said upper surface in a plurality of open positions.

5. The system of claim 1, wherein said cabinet comprises an extended upper surface, said extended upper surface extending over at least one of said first side and said second side, thereby facilitating at least one of clamping, sawing, and drilling.

6. The system of claim 1, wherein said cabinet comprises an upper surface having scales, wherein said scales comprise at least one of etched scales and marked scales.

7. The system of claim 1, wherein said cabinet comprises an upper surface having at least one hand hold.

8. The system of claim 1, wherein at least one of said first bracket and said second bracket is configured as L brackets.

9. The system of claim 1, further comprising a retention belt system removably affixed to said vehicle bed and at least one of said first bracket and said second bracket.

10. The system of claim 1, wherein at least one of said first bracket and said second bracket is configured with a ramp, said ramp configured to facilitate movement of said cabinet.

11. The system of claim 1, wherein at least one of said first bracket and said second bracket is configured with a ramp, said ramp configured to facilitate movement of at least one wheel over said ramp, wherein said at least one wheel is mounted to said cabinet.

12. The system of claim 1, wherein at least one of said first bracket and said second bracket is configured with a ramp pivotally attached to said at least one of said first bracket and said second bracket, said ramp configured to facilitate movement of said cabinet.

13. The system of claim 1, wherein at least one of said first bracket and said second bracket is configured with a ramp, said ramp configured to extend over a tailgate of said vehicle bed to facilitate movement of said cabinet over said tailgate.

14. The system of claim 1, wherein at least one of said first bracket and said second bracket is configured with a ramp, said ramp configured to extend over a groove within said vehicle bed to facilitate movement of said cabinet over said groove.

15. The system of claim 1, wherein said storage area comprises at least one removable divider having a hand hold to facilitate lifting of said divider.

16. The system of claim 1, wherein said storage area comprises at least one removable compartment having a hand hold to facilitate lifting of said removable compartment.

17. The system of claim 1, wherein a side surface of said cabinet comprises at least one drawer slidably mounted to said side surface of said cabinet.

18. The system of claim 1, further comprising at least one wheel mounted to said cabinet, wherein said one wheel includes at least one of a caster wheel, a fully articulating caster wheel, and locking mechanism.

19. The system of claim 1, further comprising a locking mechanism configured to selectively restrict said cabinet movement along said first and said second bracket.

20. The system of claim 1, wherein said adjustable height device comprises at least one of a cylinder system, pneumatic system, screw mechanism, guide rod and height adjustment actuator.

* * * * *